United States Patent
Gray et al.

(10) Patent No.: US 8,829,114 B2
(45) Date of Patent: *Sep. 9, 2014

(54) PREPARATION OF METALLIC COMONOMERS FOR POLYSTYRENE

(75) Inventors: Steven D. Gray, Florence, KY (US); Scott Cooper, Humble, TX (US); Jason Clark, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 210 days.

This patent is subject to a terminal disclaimer.

(21) Appl. No.: 13/306,088

(22) Filed: Nov. 29, 2011

(65) Prior Publication Data

US 2013/0137824 A1      May 30, 2013

(51) Int. Cl.
   *C08L 33/02*      (2006.01)
(52) U.S. Cl.
   USPC ........... 525/201; 526/240; 526/241; 526/347; 556/55
(58) Field of Classification Search
   USPC ......................................................... 556/55
   See application file for complete search history.

(56) References Cited

U.S. PATENT DOCUMENTS

| | | | | |
|---|---|---|---|---|
| 4,933,405 A | * | 6/1990 | Evani | 526/240 |
| 5,064,877 A | * | 11/1991 | Nass et al. | 522/172 |
| 7,919,640 B2 | * | 4/2011 | Khabashesku et al. | 556/55 |
| 7,919,641 B2 | * | 4/2011 | Khabashesku et al. | 556/131 |
| 2008/0051540 A1 | * | 2/2008 | Reimers et al. | 526/227 |
| 2010/0162826 A1 | * | 7/2010 | Khabashesku et al. | 73/861 |
| 2010/0168345 A1 | * | 7/2010 | Khabashesku et al. | 525/451 |

OTHER PUBLICATIONS

Yang et al., "Preparation and Thermal Characterization of the Glass Transition Temperature of Sulfonated Polystyrene-Metal Ionomers", Journal of Polymer Science: Part B: Polymer Physics, vol. 28, 1990, 1685-1697.*

Sayilkan et al., "Zirconium Tetra-n-butylate Modified with Different Organic Acids: Hydrolysis and Polymerization of the Products", Journal of Inorganic and Organometallic Polymers, vol. 5, No. 4, 1995, 409-423.*

Schubert et al., "Primary Hydrolysis Products of Methacrylate-Modified Titanium and Zirconium Alkoxides", Chem. Mater. 1192, 4, 291-295.*

* cited by examiner

*Primary Examiner* — Nicole M Buie-Hatcher (57) ABSTRACT

A method for making a polystyrene ionomer comprises: preparing a metallic comonomer within styrene monomer to form a reaction mixture; and placing the reaction mixture under conditions suitable for the formation of a polymer composition. The metallic comonomer can be a metal acrylate, formed by contacting a metal complex and an acrylate precursor.

15 Claims, 5 Drawing Sheets

PREPARATION OF METALLIC COMONOMERS FOR POLYSTYRENE

CROSS-REFERENCE TO RELATED APPLICATIONS

The present application is related to U.S. Pat. No. 7,601,788 filed Oct. 31, 2007, which is continuation of U.S. Pat. No. 7,309,740 filed Dec. 13, 2006 which was a divisional of U.S. Pat. No. 7,179,873 filed Jan. 26, 2005 each of which is entitled "Branched Ionomers" and each of which is incorporated herein by reference.

FIELD

The present invention generally relates to the preparation of polystyrene copolymers, specifically ionomers, containing metallic comonomers.

BACKGROUND

General purpose polystyrene (GPPS) is a polymer made from styrene, a vinyl aromatic monomer that can be produced from aromatic hydrocarbons, for example those derived from petroleum. GPPS is useful in a variety of applications, such as casing for appliances, molded into toys or utensils, or expanded to create foamed styrene. In most cases, GPPS is a hard and brittle plastic, however, the use of comonomers may alter its physical properties. Ionic comonomers, for example, may alter the properties of a polymer, such as melt flow rate, melt strength, polydispersity, and glass transition temperature.

Metal acrylates are an example of ionic comonomers that can be used to create a polystyrene branched ionomer. Zinc dimethacrylate (ZnDMA), for instance, is well known in the art as useful ionic comonomer for polystyrene production. Several drawbacks are associated with the use of prepared ZnDMA. ZnDMA can be expensive. Particles of ZnDMA powder tend to be less than 10 microns in diameter, causing inhalation hazards during transport to the reaction vessel due to dust. Further, ZnDMA does not easily dissolve into styrene. Feeding slurries of pre-formed ZnDMA comonomer to the reactor can be difficult; the ZnDMA may not suspend well and the consistency in feed concentration may be questionable. Swings in melt index can occur. In the reaction vessel, sticking of the methacrylate particles to the vessel surfaces can occur during mixing due to the static charge build-up on the surface of these polar compounds, resulting in gel formation and reactor fouling. Other metal acrylates can also have problems similar to those of ZnDMA when used as ionic comonomers for polystyrene.

Varying parameters such as reaction conditions, type and/or quantities of comonomer used may allow for the production of styrenic copolymer compositions tailored to meet the needs of a wide-range of end-use applications. Thus, an ongoing need exists for compositions and methodologies for the production of styrenic copolymers having improved properties.

SUMMARY

Disclosed herein is a method for the in situ preparation of a metallic comonomer comprising: contacting chemical precursors of a metallic comonomer in at least one reaction vessel containing styrene monomer; and producing a product comprising the metallic comonomer in solution with the styrene monomer. The in situ generated metallic comonomer can be a metal acrylate. The in situ generated metallic comonomer can be prepared via the contacting of a metal complex and an acrylate precursor, such as acrylic acid.

The metal complex may be selected from the group consisting of an organometallic compound comprising alkyl groups, aryl groups, alkoxides, amides or combinations thereof; organometallic compounds that react irreversibly with acrylic acids; materials that liberate conjugate acids weaker than its starting acrylic acid; compounds having a general chemical formula $MR_n$, $M(OR_4)_n$ and $M(NR_5R_6)_n$ wherein n is metal formal oxidation state and R, $R_4$, $R_5$ and $R_6$ are each independently alkyl groups, aryl groups, substituted alkyl groups, substituted aryl groups, derivatives thereof or combinations thereof; non-homoleptic alkoxide and amide complexes; and combinations thereof. The metal in the metal complex may be selected from the group consisting of main group metals, metals from groups 3 to 12 of the periodic table, and combinations thereof. the metal complex is selected from the group consisting of dibutylmagnesium ($MgBu_2$), triethyl aluminum ($AlEt_3$), tetrabenzyl zirconium $[Zn(CH_2Ph_4)]$, $Mg(OEt)_2$, $Al(O^iPr)_3$, $Ti(OBu)_4$, $Ti(NEt_2)_4$, $Zr(OPh)_n(OBu)_{4-n}$, $Ti(OBu)_n(NEt_2)_{4-n}$, $Zn(CH_2Ph)_2(OPh)_2$, $Mg(Et)_2$, $Mg(BuEt)$, $Mg(n-Hex)$, $Al(Me)_3$, $Al(iPr)_3$, or combinations thereof.

The acrylate precursor compound can be an acrylic acid. The acrylic acid can have the general formula where $R_1$, $R_2$, and $R_3$ may be the same or different and may each independently be hydrogen, an alkyl group, an aryl group, a substituted alkyl group, a substituted aryl group, derivatives thereof, or combinations thereof.

The acrylate precursor compound may be selected from the group consisting of methylacrylic acid, octyl acrylic acid, nonyl acrylic acid, decyl acrylic acid, undecyl acrylic acid, dodecyl acrylic acid, isodecyl methylacrylic acid, undecyl methylacrylic acid, stearyl methylacrylic acid and combinations thereof.

The metal complex and acrylate precursor can react according to the following equation where: M is a main group or transition metal, n is a formal oxidation state of a metal, A is a monoanionic ligand that is an alkoxy, aryloxy, amide, arylamide, or their derivatives, $R_1$, $R_2$, and $R_3$ are hydrogen, alkyl, or aryl groups, and L is an additional ligand.

When x=n, no monoanionic ligand A is present in the metallic comonomer. When x<n, monoanionic ligand A is present in the metallic comonomer. In an embodiment, the metallic comonomer is of the latter type. Examples include $Zr[O_2C(CH_3)=CH_2]_2(OBu)_2$, $Zr[O_2C(CH_3)=CH_2]_2(OiPr)_2$, $Al[(O_2C(CH_3)=CH_2]_2(OiPr)$.

The metallic comonomer can have the general formula:

where: M is a main group or transition metal; n is a formal oxidation state of a metal (+2 to +6); x is 1-5; A is a monoanionic ligand, such as an alkoxy, aryloxy, amide, arylamide, or their derivatives; $R_1$, $R_2$, and $R_3$ are hydrogen, alkyl, or aryl groups; and L is an optional additional ligand (y can be 0, when no additional ligand is desired).

In an embodiment, additional ligand L is a Lewis base donor selected from the group consisting of THF, alcohols, amines, phosphines, and similar lewis bases.

In an embodiment, the acrylate precursor is methacrylic acid and the metal complex is aluminum isopropoxide, and the resultant metallic comonomer is aluminum methacrylate.

The metallic comonomer may be present in an amount of from 100 ppm to 2000 ppm. The styrene may be present in an amount of from 1 wt. % to 99 wt. % based on the total weight of the polymer composition. The method may further include contacting the reaction mixture with an elastomer. The elastomer may be derived from the group consisting of 1,3-butadiene, 2-methyl-1,3-butadiene, 2 chloro-1,3 butadiene, 2-methyl-1,3-butadiene, 2 chloro-1,3-butadiene, aliphatic conjugated diene monomers, and combinations thereof.

The product may be polymerized to form a polystyrene ionomer, which in turn may be used to produce an article.

The metal complex and acrylate precursor may be contacted in close temporal and/or physical proximity of reaction zone, or alternatively within a reaction zone. In another arrangement, each of a metal complex and an acrylate precursor are mixed with styrene monomer to form two styrene solutions, which are contacted within a reaction zone.

DETAILED DESCRIPTION

The present invention in its many embodiments is directed towards the production of a polystyrene ionomer. Generally, the polystyrene ionomer is made via formation of a metallic comonomer within a monomer such as a styrene monomer and subsequent contacting of the metallic comonomer with styrene monomer and optionally other components in a reaction zone under conditions suitable for the formation of a polymeric composition.

When ionic comonomers are used, the polymer product can be referred to as an ionomer. An ionomer is a polymer that contains nonionic repeating units and a small portion of ionic repeating units. Generally, the ionic groups make up less than 15% of the polymer. The ionic groups are attached to the polymer backbone at random intervals and can create secondary chain interactions, in which the polar groups reversibly associate with one another, creating reversible crosslinks. Because of these crosslinks, or branches, ionomers can also be referred to as branched ionomers.

The reversible crosslinks likely are broken with heat and shear during extrusion but reform upon cooling. Branched ionomers can thus be melt processed like low molecular weight polystyrene but have the relatively higher melt strength and other improved properties expected for branched or higher molecular weight polystyrene materials. In addition, branches or crosslinks in styrene-based polymers may exhibit enhance properties such as shear thinning, bending modulus, tensile strength, impact resistance, glass transition temperature, and melt viscosity.

A group of ionic comonomers that can be used in polystyrene branched ionomers is carboxylate salts with at least one unsaturated moiety. The unsaturated moiety allows the comonomer to be incorporated into a growing polystyrene chain during radical polymerization, while the carboxylate salt is an ionic moiety capable of providing reversible crosslinks between polystyrene chains.

Polystyrene ionomers can be made using many metallic comonomers. These metallic comonomers generally are made up of an unsaturated moiety, an anionic moiety, and a cationic moiety. In an embodiment, the metallic comonomer is a carboxylate salt. The cationic moiety can be a metal ion associated with the anionic moiety of a carboxylic acid. The unsaturated moiety is a carbon-carbon double bond occurring in a chain of at least two carbon atoms connected to the carboxylic acid. The comonomer can be a metal acrylate.

In one embodiment, the metallic comonomer is a metal acrylate that has the general formula where: M is a main group or transition metal; n is a formal oxidation state of a metal (+2 to +6); x is 1-5; A is a monoanionic ligand, such as an alkoxy, aryloxy, amide, arylamide, or their derivatives; $R_1$, $R_2$, and $R_3$ are hydrogen, alkyl, or aryl groups; and L is an optional additional ligand (y=0-6; y can be 0, when no additional ligand is desired).

Examples of acrylate containing compounds suitable for use in this disclosure include without limitation, compounds having M=Zn; n=2; x=2; $R_1$=methyl; and $R_2$ and $R_3$=H (for instance, ZnDMA); compounds having M=Zr; n=4; x=4; $R_1$=methyl; and $R_2$ and $R_3$=H (for instance, $Zr((MA)_4)$); compounds having M=Zr; n=4; x=2; $R_1$=methyl; $R_2$, $R_3$=H; A=butoxide (for instance, $Zr(MA)_2(OBu)_2$); compounds having M=Zr; n=4; x=2; $R_1$=methyl; $R_2$, $R_3$=H; A=isopropyl alkoxide (for instance, $Zr(MA)_2(OiPr)_2$); or combinations thereof. Nonlimiting examples of acrylate containing compounds suitable for use in this disclosure include zinc diacrylate, zinc dimethacrylate, and the like.

The final characteristics of the polystyrene ionomer depend in part on the nature and amount of metallic comonomer used and may be tailored by one of ordinary skill in the art with the benefits of the present disclosure to meet a user and/or process desired need. For example when the metallic comonomer contains a metal acrylate, such tailoring may involve modifications to the amount of metal acrylate used in the polystyrene ionomer, the valence or formal oxidation state (") of metal (M) employed, the steric and electronic features of acrylate substituents ($R^1$, $R^2$, $R^3$), the steric and electronic nature of additional metal ligands (A, L), or combinations thereof.

In an embodiment the metallic comonomer is present in an amount of from 100 ppm to 2000 ppm, alternatively from 200 ppm to 1500 ppm, alternatively from 300 ppm to 800 ppm based on total polymer composition.

The metallic comonomer may be prepared using any method compatible with the other components in the polystyrene ionomer. In an embodiment, the metallic comonomer is prepared by the contacting of a metal complex and a metal carboxylate precursor. The metallic comonomer may be prepared in situ, which can mean in temporal and/or physical proximity to the reaction zone into which it will be used. The methodologies disclosed herein for the preparation of the metallic comonomer may provide numerous advantages such as reducing the handling of toxic materials and preventing the need for storage of these materials.

The metal acrylate may be prepared by contacting a metal complex and an acrylate precursor. In an embodiment, the acrylate precursor includes acrylic acid. Examples of acrylic acids suitable for this process include those of the general formula shown in Structure 1 where $R^1$, $R^2$, and $R^3$ may be the same or different and may each independently be hydrogen, an alkyl group, an aryl group, a substituted alkyl group, a substituted aryl group, derivatives thereof, or combinations thereof. For example, the acrylate precursor may be methylacrylic acid where $R^1$ is a methyl group ($CH_3$), and $R^2$ and $R^3$ are hydrogen atoms. Examples of other suitable acrylate precursors include octyl acrylic acid, nonyl acrylic acid, decyl acrylic acid, undecyl acrylic acid, dodecyl acrylic acid, isodecyl methacrylic acid, undecyl methacrylic acid, stearyl methacrylic acid, or combinations thereof.

Structure 1

Many metal-containing complexes can be used for the in-situ generation of a metallic comonomer, which may improve the flexibility and the range of options when forming comonomers. Many metal complexes are relatively inexpensive and can dissolve in styrene. Thus, in-situ generated metallic comonomers of the present invention can incur a lower cost and have greater solubility, in comparison to conventional metallic comonomers, such as ZnDMA.

In an embodiment, the metal complex includes an organometallic compound. The metal complex can be represented as $MA_nL_y$, wherein M is a main group or transition element such as those found in groups 3 to 12 of the periodic table; A is a monoanioic ligand; n is a metal formal oxidation state from +2 to +6, and L is an optional additional ligand. Organometallic compounds suitable for use in this disclosure include without limitation metal compounds including alkyl groups, aryl groups, alkoxides, amides or combinations thereof. The metal complex may include organometallic compounds that irreversibly react with acrylic acids. Examples of such compounds include dibutylmagnesium ($MgBu_2$), triethyl aluminum ($AlEt_3$), tetrabenzyl zirconium, $TaMg_5$, $WMe_6$, and [Zn($CH_2Ph_4$)].

In an embodiment, the organometallic compounds can be materials that liberate conjugate acids weaker than acrylic acid and also small molecules that are easily distilled. Liberating conjugate acids weaker than the starting acrylic acids may favor rapid metathesis. Examples of such compounds include alkoxide and amide species, in which the monoanionic ligand (A) has the general chemical formula ($OR_4$) or ($NR^5R^6$) respectively wherein O is oxygen; N is nitrogen; and $R^4$, $R^5$ and $R^6$ are each independently alkyl groups, aryl groups, substituted alkyl groups, substituted aryl groups, derivatives thereof or combinations thereof. Examples of such compounds include $Mg(OEt)_2$, $Al(OiPr)_3$, $Ti(OBu)_4$, $Ta(NMe_2)_5$, $W(OiBu)_6$ and $Ti(NEt_2)_4$.

In another embodiment, the organometallic compounds include non-homoleptic alkoxide and amide complexes such as for example $Zr(OPh)_n(OBu)_{4-n}$. In yet another embodiment, the organometallic compound includes metal complexes that upon reaction with the acrylate precursor produce species with a decreased acidity with respect to the starting compounds. Examples of such compounds include metal alkoxides or metal amides comprising aryl groups and compounds comprising siloxides. In yet another embodiment, the organometallic compound includes a mixture of complexes having the properties described previously. Examples of such complexes include $Ti(OBu)_n(NEt_2)_{4-n}$, $Zr(CH_2Ph)_2(OPh)_2$. Other examples include $MgAl_2(OR)_x$ and $MgZr(OR)_x$ which are double metal alkoxides commercially available from Gelest Chemicals.

Additional ligands, L, in the metal complex may be employed to fine tune solubility and reactively as well as final product properties. Examples of L-ligands may include Lewis base donors such as THF, alcohols, amines, and the like.

Various factors may be considered by one of ordinary skill in the art in the selection of the metal to employ in the formation of the metal acrylate. For example, in determining suitable transition metal precursors, the relative ease at which the metal's ligands are displaced to form carboxylate species upon reaction with the acrylate precursor may be considered.

The reaction between the metal complex and the acrylate precursor may be generally represented by Equation 1:

Equation 1 where: M is a main group or transition metal; n is a formal oxidation state of a metal (+2 to +6); x is 1-5; A is a monoanionic ligand; $R_1$, $R_2$, and $R_3$ are hydrogen, alkyl, or aryl groups; and L is an optional additional ligand. For example, a metal complex such as $Zr(O^iPr)_4$ (M=Zr, R=$^i$Pr, n=4) can be treated with the appropriate level of methyl acrylic acid ($R^1$=$CH_3$ and $R^2$, $R^3$=H) to afford the mono (m=1), di (m=2), tri (m=3), or tetrakis (m=4) substituted zirconium acrylate with the substitution being based on the final polymer property requirements. In an embodiment, azeotropic removal of the isopropanol byproduct is used to control the reaction. In an alternative embodiment, an excess of methyl acrylic acid is used to drive the equilibrium with the excess acid either sent to the reaction or removed by distillation prior to sending the material to the reactor. Such parameters may be adjusted to meet the needs of the process. Such reactions are described in U.S. Pat. No. 7,179,873 which is incorporated by reference herein in its entirety.

Generally, n=x, so that the metallic comonomer does not contain any of the anionic ligand A. When this is the case, the monoanionic ligands A are replaced by the acrylic acid upon contact with the acrylate precursor, to form a metal acrylate. In an alternate embodiment, x<n, and anionic ligand A is present in the metallic comonomer. The A ligands, in these cases, are not fully replaced, resulting in mixed-species type metallic comonomers that contain a metal, an acrylate, and the anionic A ligand. Such mixed-species type metallic comonomers include $Zr[O_2C(CH_3)=CH_2]_2(OBu)_2$, $Zr[O_2C(CH_3)=CH_2]_2(OiPr)_2$, and $Al[(O_2C(CH_3)=CH_2]_2(O^iPr)$. Mixed species such as $Al[(O_2C(CH_3)=CH_2]_2(O^iPr)$, for example, could impart different intermolecular binding energies between the pseudo-networked materials altering the processing/property balance.

The metal acrylate may be present in an amount effective to impart one or more user-desired properties to the polystyrene ionomer. For example, the metal acrylate may be present in the polystyrene ionomer in an amount ranging from 0.01 to 50% weight percent by total weight of the composition, alternatively from 0.01 wt. % to 25 wt. %, alternatively from 0.1 wt. % to 10 wt. %, alternatively from 0.1 wt. % to 5 wt. %, alternatively from 0.1 wt. % to 1 wt. %, alternatively from 0.01 wt. % to 1 wt. %. In an embodiment, the amount of polystyrene present in the polystyrene ionomer may range from 25 to 99.99% weight percent by total weight of the polystyrene ionomer, alternatively from 25 wt. % to 95 wt. %, alternatively from 50 wt. % to 90 wt. %, alternatively from 50 wt. % to 75 wt. %.

The term "ionomer" is used throughout the application to refer to the copolymer of a styrenic monomer and metallic comonomer that is networked or branched via ionic interactions. Thus, terms such as "networked styrenic copolymer", "branched ionomer" and the like describe the same polymer composition of the present invention and can be used interchangeably with the term "polystyrene ionomer." The styrenic monomer of the present invention can be chosen from styrene, other vinylidene aromatic monomers, or combinations thereof. Styrene monomer includes a variety of substituted styrenes (e.g., alpha-methyl styrene), ring-substituted styrenes such as p-methylstyrene as well as unsubstituted styrenes.

The polystyrene ionomer can be formed in the presence of one or more additional comonomers and/or elastomers. In an embodiment, the polystyrene ionomer includes styrene and an elastomeric material such that the resulting polymer is a high impact polystyrene (HIPS). Such HIPS contains an elastomeric material that is embedded in the styrenic polymer resulting in the composition having an increased impact resistance. The elastomer can be derived from a conjugated diene, such as 1,3-butadiene, 2-methyl-1,3-butadiene, 2 chloro-1,3 butadiene, 2-methyl-1,3-butadiene, and 2 chloro-1,3-butadiene. Alternatively, the polystyrene ionomer can be HIPS having an elastomer derived from an aliphatic conjugated diene monomer. Without limitation, examples of suitable aliphatic conjugated diene monomers include $C_4$ to $C_9$ dienes such as butadiene monomers. Blends or copolymers of the diene monomers may also be used.

In an embodiment, the polystyrene ionomer is a terpolymer, a copolymer, or a copolymer adduct. For example, the polystyrene ionomer may be an acrylonitrile styrene butadiene (ABS) copolymer; a free acid copolymer (PS/MA/HMA); or a styrene, metal acrylate, free acrylic acid adduct (PS/MA.HMA).

In an embodiment, the polystyrene ionomer is ABS. ABS is a class of thermoplastic terpolymers with usually more than about 50% styrene and varying amounts of acrylonitrile and butadiene. The three components are combined by using methods known to one of ordinary skill in the art such as for example polymerization, graft copolymerization, physical mixtures and combinations thereof.

Polystyrene ionomers of the present invention can be used in many applications, such as extrusion, foaming, oriented sheet and production, molding, and the like.

Figure 1:
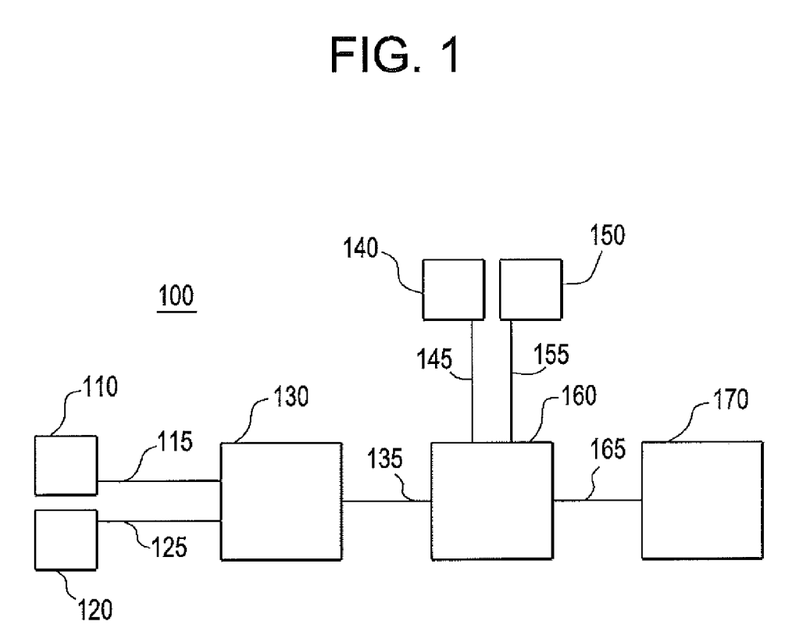
FIG. 1 is a schematic view of one embodiment of a reactor system.

In one embodiment, the invention is a method for preparing a metal acrylate that includes contacting a metal complex and a metal acrylate precursor, both of the type described previously herein. FIG. 1 is one embodiment of a mixing system that may be used for contacting the metal complex and the acrylate precursor. Referring to FIG. 1, a system 100 may have at least two vessels 110 and 120 that are in fluid communication with a mixing vessel 130 via flowlines 115 and 125, respectively. Additionally, fluid pumps and/or valves may be used to regulate the rate at which the contents of both vessels 110 and 120 are fed into the mixing vessel 130. In an embodiment, the vessels 110 and 120 contain a metal complex and a metal acrylate precursor, respectively.

The system 100 may include additional devices and mechanisms to regulate conditions within the mixing vessel 130 such as temperature controlling jackets, agitators, mixers, and the like that may be coupled to the mixing vessel 130 to allow for a series of user-desired conditions within the mixing vessel 130. Such devices and mechanisms would be known to one of ordinary skill in the art. The mixing vessel 130 may also be vented at a reduced pressure or equipped with a condenser or a partial condenser to remove unwanted byproducts that may be present or formed following the contacting of the metal complex and metal acrylate precursor. The metal acrylate precursor and metal complex may be contacted in the mixing vessel 130 for a time period and under conditions conducive to the formation of a metal acrylate. Such conditions may vary depending on a number of factors such as the type and amount of metal acrylate to be formed and may be determined empirically.

In an embodiment, in situ formation of the metal acrylate includes contacting the reagents described previously herein in a mixing vessel of the type schematized in FIG. 1 to generate a metal acrylate. The mixing vessel 130 may be in fluid communication with one or more reaction zones such as to allow the metal acrylate composition to enter a reaction zone where it may be employed for the preparation of the polystyrene ionomer. Hereinafter the reaction zone for preparation of the polystyrene ionomer will be termed reaction zone 1. Reaction zone 1 may have one or more reactors and will be described in more detail later herein. In an embodiment, reaction zone 1 includes all devices located downstream of mixing vessel 130 in FIG. 1. The components necessary for preparing the metal acrylate may be contacted before or within a mixing chamber that is in proximity to reaction zone 1.

In alternative embodiments, the metal complex and metal acrylate precursor may be contacted within reaction zone 1. For example, the metal acrylate precursor and metal complex may be contacted in reaction zone 1 under conditions suitable for the formation of the metal acrylate. The metal acrylate may then be contacted with the styrenic polymer, optional elastomer, and other components under conditions suitable for the preparation of the polystyrene ionomer. Alternatively, the metal acrylate may be prepared in one or more devices co-housed or co-attached to one or more reaction zones wherein the metal acrylate is to be employed. Alternatively, the metal acrylate may be prepared in close physical proximity to the reaction zone wherein material is to be employed. In some embodiments, in situ formation of the metal acrylate involves contacting the components necessary to form a metal acrylate within a reaction zone (e.g. polymerization vessel) in order to form a metal acrylate during or immediately prior to the use of the metal acrylate in a user desired process. Herein in situ refers to preparation of the metal acrylate in close temporal/physical proximity to a reaction zone (e.g., reaction zone 1), alternatively within the reaction zone, in which it is to be employed.

The metal acrylate generated in the mixing vessel 130 may function as a feed component to a downstream reactor. Referring to FIG. 1, the metal acrylate generated in mixing vessel 130 may be conveyed downstream via flowline 135 to a prepolymerization reactor 160. The prepolymerization reactor 160 may also receive additional feed components (e.g. comonomer, catalyst, cocatalyst, etc) from vessels 140 and 150 via flowlines 145 and 155, respectively. The feed components from the mixing vessel 130 and the vessels 140 and 150 may be subject to conditions in the prepolymerization reactor 160 that allow for the polymerization of components of the feed to reach a desired conversion. In an embodiment, the feed components further include styrene monomer and the resultant polymer includes polystyrene-metal acrylate. In an alternative embodiment, the feed components further include styrene monomer and one or more elastomers of the type described herein and the resultant product is a HIPS-metal acrylate copolymer. As will be understood by one of ordinary skill in the art, the reaction to produce the metal acrylate will result in formation of additional materials that may be removed prior to the entry of the metal acrylate into reaction zone 1. Additional devices (e.g. filters, sorbents, etc.) may be disposed downstream of the mixing vessel 130 and upstream of reaction zone 1 (e.g., upstream of prepolymerization reactor 160) so as to allow for purification of the metal acrylate composition and removal of materials that may negatively impact the production and/or quality of the polystyrene ionomer.

The effluent from the prepolymerization reactor 160 may be conveyed to additional downstream reactor systems to further the polymerization of the feed components as is known to one of ordinary skill in the art and described in detail in the literature. For example, the effluent from the prepolymerization reactor 160 may be passed through a heating device into a polymerization reactor 170 via flowline 165. Upon completion of the polymerization reaction the effluent of the polymerization reactor 170, may be recovered and subsequently processed, for example devolatized, pelletized, etc.

The system 100 may include additional devices such as heaters, coolers, pumps, temperature/pressure controls, valves, static mixers, vents, condenser, and the like as needed. The polymerization process will be described in more detail later herein.

Figure 2:
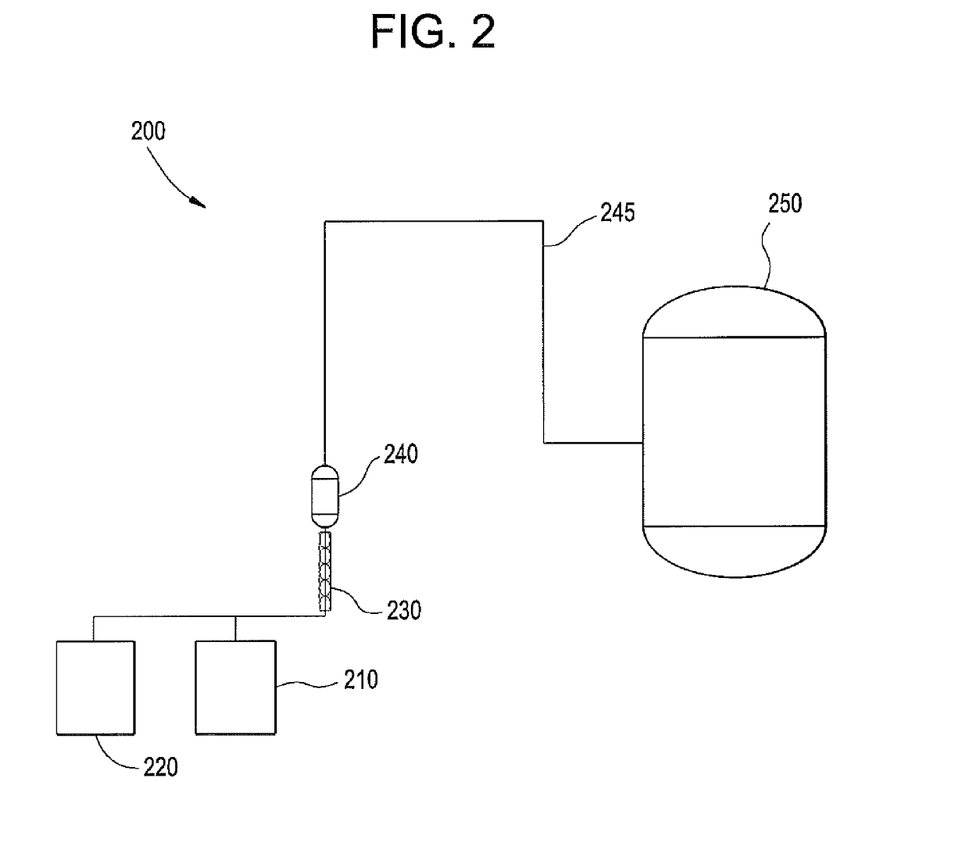
FIG. 2 is a schematic of the feed system of Example 1.

Referring to FIG. 2, in an alternative embodiment, in situ generation of a metal acrylate of the type described herein is carried out using a mixing system 200. In such an embodiment, the metal acrylate precursor (e.g., H-MA) may be mixed with styrene monomer in one vessel 220 while styrene monomer and a metal complex (e.g., $Al(OiPr)_3$) are in a second vessel 210. Feeds from the two vessels may enter a downstream static mixer 230 wherein the feeds are contacted to form a reaction mixture and subsequently conveyed to a contacting vessel 240 which is in fluid communication with the static mixer 230. For example, a first feed may contain the styrene monomer and the acrylate precursor while a second feed may contain the metal complex. The first and second feed may enter a static mixer 230 before being conveyed to a contacting vessel 240. The reaction mixture may have a residence time in the contacting vessel 240 sufficient to allow for in situ formation of the metal acrylate. In an embodiment, the reaction mixture residence time in the contacting vessel 240 ranges from 15 minutes to 1 hour, alternatively from 20 minutes to 45 minutes, alternatively 30 minutes. Following the residence time, the reaction mixture may enter conduit 245 and be conveyed to one or more downstream polymerization reactors 250.

The process for in situ formation of the metal acrylate as described herein may reduce the need for handling fine metal acrylate powders that offer challenges to large-scale production. Additionally, the process allows a variety of materials to be generated employing a single feed system that allows the properties of the comonomer to be tailored to control the properties of the final polymer. Further, the formation of the metal acrylate in situ may allow for improved control of the ratio of acrylic acid to the metal complex as well as the overall feed rate to the polymerization unit thus, enabling both the class and overall concentration of the in situ generated comonomer to be dictated by the desired attributes of the final polystyrene ionomer.

In an embodiment, the polymerization reaction to form the polystyrene ionomer may be carried out in a solution or mass polymerization process. Mass polymerization, also known as bulk polymerization, refers to the polymerization of a monomer in the absence of any medium other than the monomer and a catalyst or polymerization initiator. Solution polymerization refers to a polymerization process in which the monomers and polymerization initiators are dissolved in a non-monomeric liquid solvent at the beginning of the polymerization reaction. The liquid is usually also a solvent for the resulting polymer or copolymer.

The temperature ranges useful with the process of the present disclosure can be selected to be consistent with the operational characteristics of the equipment used to perform the polymerization. In one embodiment, the temperature range for the polymerization can be from 70° C. to 240° C. In another embodiment, the temperature range for the polymerization can be from 100° C. to 180° C. In yet another embodiment, the polymerization reaction may be carried out in a plurality of reactors with each reactor having an optimum temperature range. For example, the polymerization reaction may be carried out in a reactor system employing first and second polymerization reactors that are either continuously stirred tank reactors (CSTR) or plug-flow reactors. In an embodiment, a polymerization reactor for the production of a polystyrene ionomer of the type disclosed herein comprising a plurality of reactors may have the first reactor (e.g. a CSTR), also known as the prepolymerization reactor, operated in the temperature range of from 70° C. to 135° C. while the second reactor (e.g. CSTR or plug flow) may be operated in the range of from 100° C. to 165° C.

EXAMPLE

The following example is meant to be merely illustrative of a particular embodiment of the present invention, and is by no means limiting of the scope of the invention.

In situ preparation of a metal acrylate of the type described herein was investigated. Aluminum isopropoxide, $Al(O^iPr)_3$, and methacrylic acid, H-MA, were mixed in different batches of styrene, which were then mixed en route to a polymerization unit. Upon contact between these two chemicals, they formed a comonomer (presumably, $Al(MA)_3$) that reacted with styrene in a similar fashion as would ZnDMA. The experiment consisted of three different conditions, where the primary variable was the concentration of $Al(MA)_3$ feed to the unit. The three concentration conditions were as follows: Trial A: 250 ppm $Al(MA)_3$; Trial B: 500 ppm $Al(MA)_3$; and Trial C: 800 ppm Al(MA)$_3$. The Al(OiPr)$_3$ and H-MA were mixed in different batches of styrene, which were then mixed en route to the reactor. An additive feed system for mixing of the styrene monomer comprising either Al(OiPr)$_3$ or H-MA is depicted in FIG. 2 which was previously described herein. The aluminum content, color (type, color L, color a, color b, yellowness index), Gel permeation characteristics (GPC) (including number average molecular weight (Mn), weight average molecular weight (Mw), size average molecular weight (Mz), polydispersity, peak MW), melt flow, and melt strength (force & velocity). These results are presented in Table 1. A styrenic polymer commercially available from Total Petrochemicals USA, Inc., CX5229, was used as the control resin. The color measurements were made in accordance with ASTM D-1295.

TABLE 1

|  | Sample | | | |
|---|---|---|---|---|
| Test | Control | Trial A | Trial C | Trial B |
| Aluminum XRF | | | | |
| Aluminum content | 0 ppm | 4 ppm | 6 ppm | 28 ppm |
| Color | | | | |
| Sample Type | — | Chip | Chip | Chip |
| Color L | — | 80.4 | 80.1 | 78.6 |
| Color a | — | −2.09 | −2.09 | −2.13 |
| Color b | — | 2.56 | 2.86 | 3.29 |
| YI | — | 3.84 | 4.5 | 5.55 |
| GPC | | | | |
| $M_n$ kg/mol | 94.658 | 95.707 | 96.165 | 95.703 |
| $M_w$ kg/mol | 214.767 | 217.814 | 219.374 | 219.064 |
| $M_z$ kg/mol | 363.954 | 373.623 | 374.393 | 375.388 |
| Polydispersity | 2.269 | 2.275 | 2.281 | 2.289 |
| Peak MW kg/mol | 194.492 | 195.304 | 197.571 | 196.523 |
| Melt flow | | | | |
| MFR g/10 min | 4.41 | 4.97 | 4.58 | 4.72 |
| Melt strength | | | | |
| Force | 0.024 N | 0.016 N | 0.016 N | 0.016 N |
| Velocity | 3.33 m/s | 3.33 m/s | 3.33 m/s | 3.33 m/s |

Figure 3:
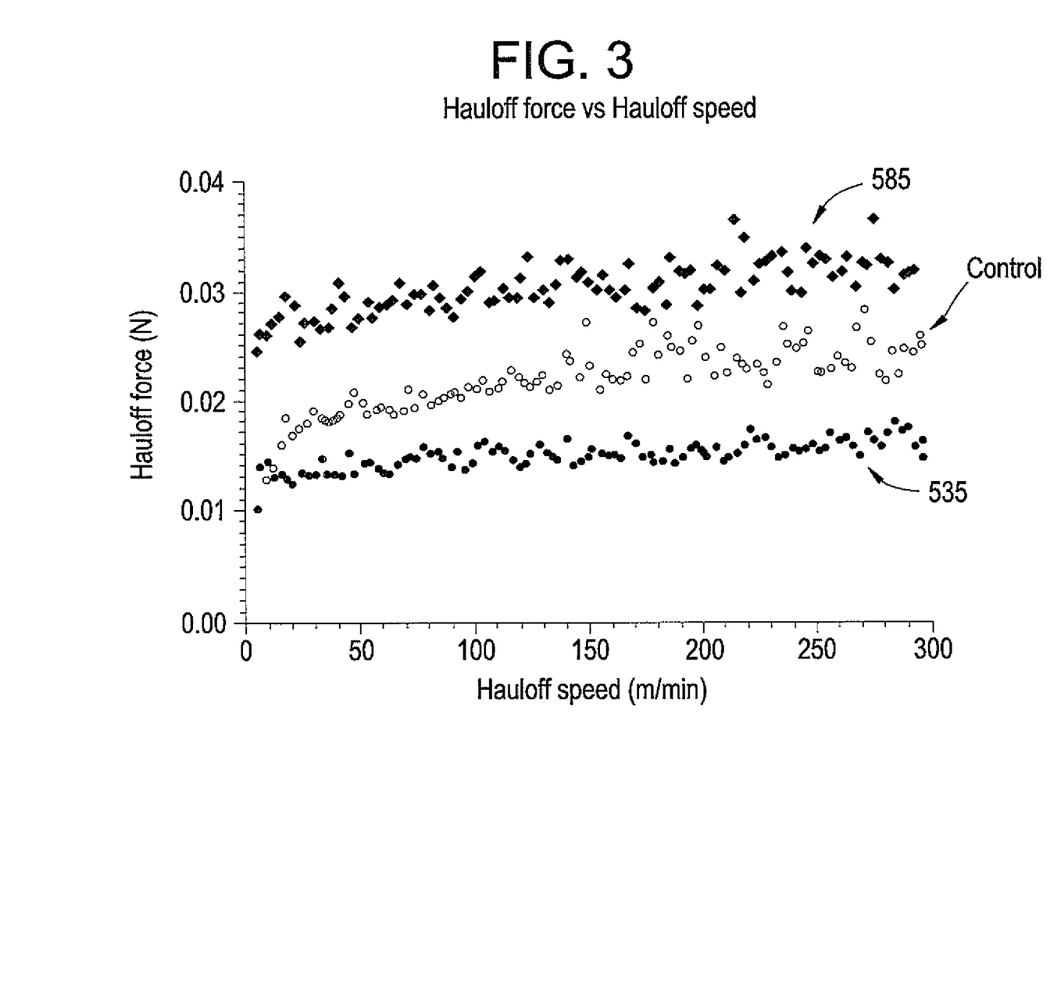
FIGS. 3 and 4 are graphs of hauloff force as a function of hauloff speed for samples from the example.
Figure 4:
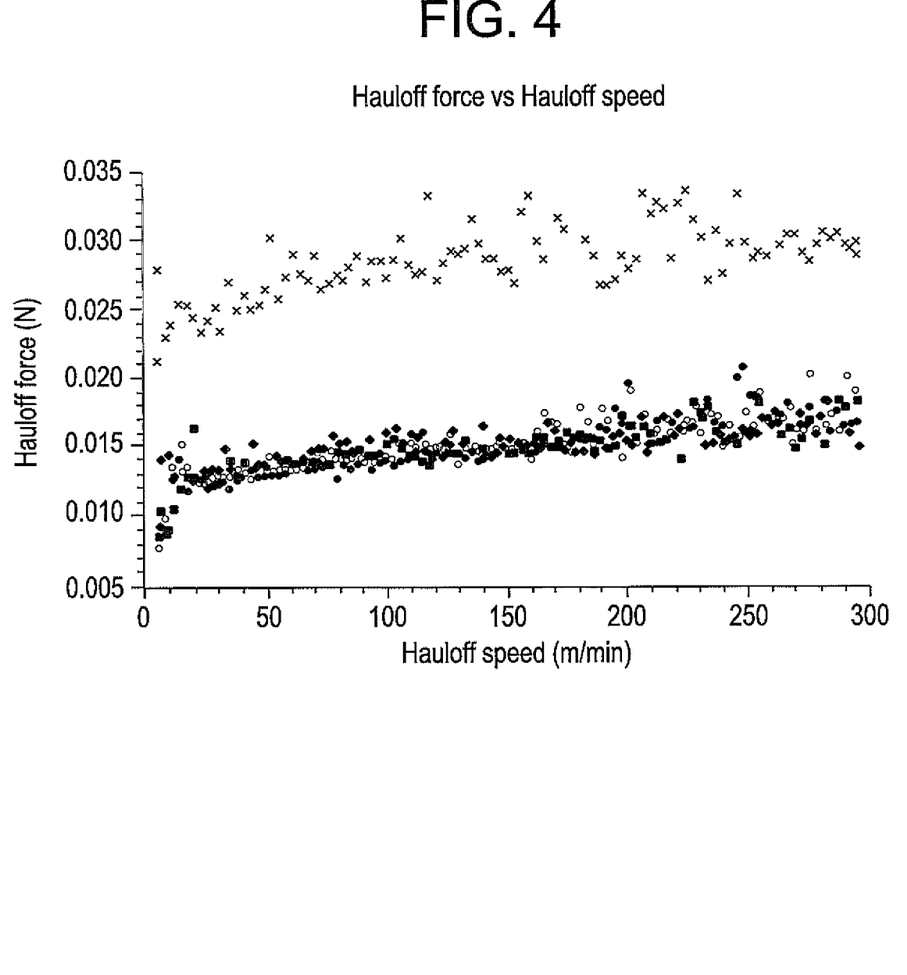

The melt strengths of the samples prepared in Trials A-C, Control (CX5229), Total Petrochemicals 585 and Total Petrochemicals 535 are compared in FIGS. 3 and 4. Total Petrochemicals 585 is a high molecular weight, low melt flow, high heat crystal grade polystyrene and Total Petrochemicals 535 is a high heat crystal polystyrene, both of which are commercially available from Total Petrochemicals USA, Inc. The melt strengths were determined using the hauloff method. The hauloff method measures the extensional properties of polymer melts by dragging a vertical melt strand at a constant pull-off speed with a linear or exponentially accelerating velocity. The force needed to elongate the strand is used to calculate the melt strength.

Referring to FIG. 3, the baseline condition for CX-5229 demonstrates there is an increase in melt strength over that of Total Petrochemicals 535, putting the material closer to the melt strength of Total Petrochemicals 585 while maintaining a higher melt flow rate typically associated with Total Petrochemicals 535.

In contrast, as shown in FIG. 4, the samples from Trial A-C displayed no appreciable increase in melt strength but the high melt flow is maintained. Color and GPC were similar to those observed with the control sample. Further, during reaction when mixing the solution into the two separate feed pots a drastic increase in temperature was noted, the pump head pressure spiked indicating a plug somewhere along the feed line, and a color change to the Al(OiPR)$_3$ and H-MA solutions was noted when placed in the stainless steel feed vessels. Further additional experiments having an increase in Al(OiPR)$_3$ and H-MA feed rate showed the melt flow rate did not decrease as expected during online testing.

Figure 5:
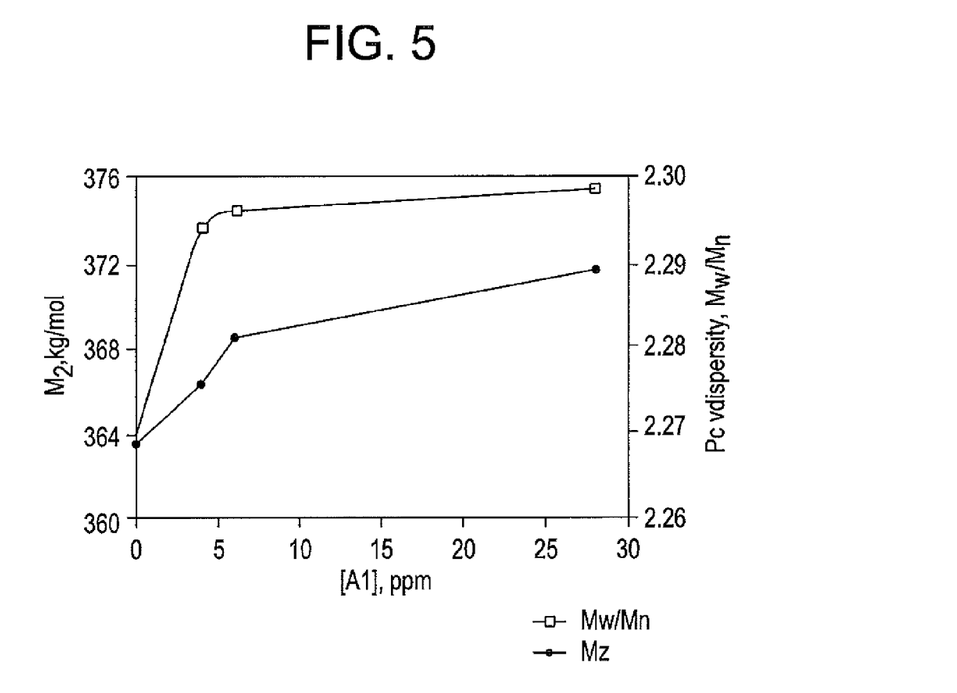
FIG. 5 is graph showing Mz and polydispersity as a function of aluminum concentration for samples from the example.

FIG. 5 shows Mz and polydispersity as a function of aluminum concentration, in ppm, for the three trial resins. As the figure indicates, trials A-C show a trend of increased Mz and polydispersity with increased concentration of the Aluminum metal complex.

As used herein, the term "acrylate" can include related compounds such as a methacrylate.

As used herein, the term "ionomer" refers to a copolymer comprising as ionic comonomer that provides reversible networking/branching to the polymer composition.

As used herein, the term "metallic comonomer" refers to a comonomer for preparing an ionomer that contains a metal ion.

Herein in situ refers to preparation of a metallic comonomer in close temporal/physical proximity to a reaction zone, alternatively within the reaction zone, in which it is to be employed.

The various embodiments of the present invention can be joined in combination with other embodiments of the invention and the listed embodiments herein are not meant to limit the invention. All combinations of various embodiments of the invention are enabled, even if not given in a particular example herein.

While illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof and the scope thereof is determined by the claims that follow.

What is claimed is:

1. A method for the formation of a metallic comonomer in styrene monomer comprising:
    contacting chemical precursors of a metallic comonomer within styrene monomer;
    wherein contacting said chemical precursors produces a product comprising the metallic comonomer in solution with the styrene monomer;
    wherein the chemical precursors comprise an acrylate precursor and a metal complex, and wherein the metal complex is a compound having a general chemical formula M(NR$_5$R$_6$)$_n$ wherein n is a metal formal oxidation state and R$_5$ and R$_6$ are each independently alkyl groups, aryl groups, substituted alkyl groups, substituted aryl groups, derivatives thereof or combinations thereof and wherein M is a metal.

2. The method of claim 1 wherein the chemical precursors further comprise:
an organometallic compound comprising alkyl groups, aryl groups, alkoxides, amides or combinations thereof;
organometallic compounds that irreversibly react with acrylic acids;
materials that liberate conjugate acids weaker than its starting acrylic acid;
non-homoleptic alkoxide and amide complexes;
materials that upon reaction with an acrylate precursor produce species with a decreased acidity with respect to the starting compounds; or combinations thereof.

3. The method of claim 1 wherein the metal in the metal complex is selected from the group consisting of main group metals, metals from groups 3 to 12 of the periodic table, and combinations thereof.

4. The method of claim 1 wherein the acrylate precursor compound comprises acrylic acid.

5. The method of claim 4 wherein the acrylic acid has the general formula where $R^1$, $R^2$, and $R^3$ are the same or different and are each independently selected from hydrogen, an alkyl group, an aryl group, a substituted alkyl group, a substituted aryl group, derivatives thereof, or combinations thereof.

6. The method of claim 1 wherein the acrylate precursor compound is selected from the group consisting of octyl acrylic acid, nonyl acrylic acid, decyl acrylic acid, undecyl acrylic acid, dodecyl acrylic acid, isodecyl methylacrylic acid, undecyl methylacrylic acid, stearyl methylacrylic acid and combinations thereof.

7. The method of claim 1, wherein the chemical precursors further comprise a ligand that is a Lewis base donor selected from the group consisting of THF, alcohols, amines.

8. The method of claim 1 wherein the metallic comonomer is present in an amount of from 100 ppm to 2000 ppm based on the total weight of the solution of the metallic comonomer and the styrene monomer.

9. The method of claim 1 wherein the styrene monomer is present in an amount of from 1 wt. % to 99 wt. % based on the total weight of the solution of the metallic comonomer and the styrene monomer.

10. The method of claim 1 further comprising contacting the solution of the metallic comonomer and the styrene monomer with an elastomer.

11. The method of claim 10 wherein the elastomer is derived from materials selected from the group consisting of 1,3-butadiene, 2-methyl-1,3-butadiene, 2 chloro-1,3 butadiene, 2-methyl-1,3-butadiene, 2 chloro-1,3-butadiene, aliphatic conjugated diene monomers, and combinations thereof.

12. The method of claim 1, wherein the contacting of the chemical precursors occurs in close temporal and/or physical proximity to a reaction zone for the polymerization of an ionomer.

13. The method of claim 1, wherein the contacting of the chemical precursors occurs within a reaction zone for the polymerization of an ionomer.

14. The method of claim 1, wherein the contacting of the chemical precursors comprises:
independently mixing each of the metal complex and the acrylate precursor with the styrene monomer to form two styrene monomer solutions; and
contacting the two styrene monomer solutions in a reaction zone for the polymerization of an ionomer.

15. The method of claim 1, wherein the contacting of the chemical precursors comprises:
independently mixing each of the metal complex and the acrylate precursor with the styrene monomer to form two styrene monomer solutions;
contacting the two styrene monomer solutions in a static mixer to form a reaction mixture;
conveying the reaction mixture to a contacting vessel, wherein the reaction mixture has a residence time in the contacting vessel sufficient for in situ formation of the second monomer; and
conveying the reaction mixture to a reaction zone for polymerization of an ionomer.

* * * * *